US012561551B2

(12) United States Patent
Guan et al.

(10) Patent No.: US 12,561,551 B2
(45) Date of Patent: Feb. 24, 2026

(54) SAMPLER AND APPARATUS FOR EXECUTING GRAPH NEURAL NETWORK MODEL

(71) Applicant: Alibaba (China) Co., Ltd., Hangzhou (CN)

(72) Inventors: Tianchan Guan, Shanghai (CN); Yanhong Wang, Shanghai (CN); Shuangchen Li, Sunnyvale, CA (US); Heng Liu, Shanghai (CN); Hongzhong Zheng, Los Gatos, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 1040 days.

(21) Appl. No.: 17/677,927

(22) Filed: Feb. 22, 2022

(65) Prior Publication Data

US 2022/0318592 A1 Oct. 6, 2022

(30) Foreign Application Priority Data

Mar. 2, 2021 (CN) .......................... 202110231273.7

(51) Int. Cl.
*G06N 3/04* (2023.01)
*G06F 7/58* (2006.01)

(52) U.S. Cl.
CPC ............... *G06N 3/04* (2013.01); *G06F 7/582* (2013.01)

(58) Field of Classification Search
CPC ........... G06F 7/582; G06F 7/588; G06N 3/04
See application file for complete search history.

(56) References Cited

U.S. PATENT DOCUMENTS

| | | | |
|---|---|---|---|
| 11,175,976 B2 | 11/2021 | Lavrentyev et al. |
| 11,188,850 B2 | 11/2021 | Pisner |

(Continued)

FOREIGN PATENT DOCUMENTS

| | | |
|---|---|---|
| CN | 110352432 A | 10/2019 |
| CN | 111291138 A | 6/2020 |

(Continued)

OTHER PUBLICATIONS

J. Hertz, "Data Buffers to the Rescue for Bandwidth-Burdened Server and Cloud Applications", News, All About Circuits, Sep. 11, 2020. (Year: 2020).*

(Continued)

*Primary Examiner* — Andrew Caldwell
*Assistant Examiner* — Jonathan David Warner
(74) *Attorney, Agent, or Firm* — Sheppard Mullin Richter & Hampton LLP

(57) ABSTRACT

A sampler for executing a graph neural network (GNN) model are disclosed. The sampler is configured to implement random sampling for neighbor nodes around a specified node of a GNN model, and performs: obtaining a quantity of neighbor nodes around the specified node and a target number of neighbor nodes to be sampled; dividing a range into a plurality of subranges based on the target number; generating random numbers; determining a plurality of integer values within the plurality of subranges based on the random numbers; determining index values of the target number of neighbor nodes to be sampled by matching index values of the neighbor nodes and the plurality of determined integer values; and writing the determined index values into an output buffer. The sampler provided in the present disclosure can uniformly sample the neighbor nodes around the specified node for the specified node.

20 Claims, 7 Drawing Sheets

(56)                References Cited

U.S. PATENT DOCUMENTS

| | | | |
|---|---|---|---|
| 11,195,616 | B1 | 12/2021 | Seemakurty et al. |
| 11,200,484 | B2 | 12/2021 | Cherubini et al. |
| 11,210,341 | B1 | 12/2021 | Bhagat |
| 11,222,217 | B1 | 1/2022 | Zhang et al. |
| 2017/0017892 | A1* | 1/2017 | Bernstein ................ G06F 17/18 |
| 2019/0095806 | A1 | 3/2019 | Martinez et al. |
| 2020/0151563 | A1 | 5/2020 | Zong et al. |
| 2020/0250734 | A1 | 8/2020 | Pande et al. |
| 2021/0357207 | A1 | 11/2021 | Copty et al. |
| 2021/0366125 | A1 | 11/2021 | Jia et al. |
| 2021/0383207 | A1 | 12/2021 | Beery et al. |
| 2021/0390294 | A1 | 12/2021 | Huang et al. |
| 2021/0390393 | A1 | 12/2021 | Huang et al. |
| 2021/0397787 | A1 | 12/2021 | Nagvenkar et al. |
| 2021/0397924 | A1 | 12/2021 | Hong et al. |
| 2021/0400059 | A1 | 12/2021 | Hong et al. |
| 2021/0406452 | A1 | 12/2021 | Hasan |

FOREIGN PATENT DOCUMENTS

| | | | |
|---|---|---|---|
| CN | 111881936 | A | 11/2020 |
| CN | 112070054 | A | 12/2020 |
| CN | 112085172 | A | 12/2020 |
| CN | 112085615 | A | 12/2020 |
| WO | 2020160044 | A1 | 8/2020 |

OTHER PUBLICATIONS

Supplemental Search Report for Chinese Application No. 202110231273.7 mailed on Mar. 26, 2025.

First Office Action for Chinese Application No. 202110231273.7 mailed on Mar. 10, 2025.

Hamilton et al., "Inductive Representation Learning on Large Graphs", arXiv:1706.02216v4 [cs. SI], 31st Conference on Neural Information Processing Systems (NIPS 2017), Sep. 10, 2018.

\* cited by examiner

FIG. 9
1000
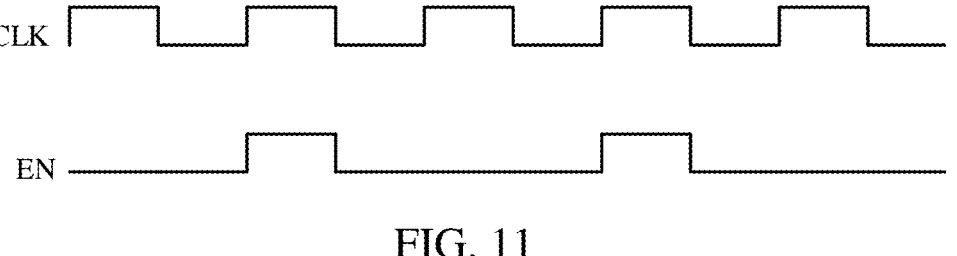
FIG. 10
FIG. 11

Generate a plurality of random numbers — S101

Perform a mathematical operation, to obtain a plurality of third integer values — S102

Determine to-be-sampled neighbor nodes from all neighbor nodes around a specified node according to the plurality of third integer values — S103

SAMPLER AND APPARATUS FOR EXECUTING GRAPH NEURAL NETWORK MODEL

CROSS REFERENCE TO RELATED APPLICATION

The present application is based on and claims priority to Chinese Patent Application No. 202110231273.7, filed on Mar. 2, 2021, which is incorporated herein by reference in its entirety.

TECHNICAL FIELD

This disclosure relates generally to the field of artificial intelligence (AI), and in particular, to a sampler and an apparatus for a graph neural network (GNN) model.

BACKGROUND

In recent years, deep learning models are widely developed in all aspects such as image classification, speech recognition, and natural language processing, and gain a series of successful applications. However, in increasingly more realistic scenarios, data is represented in the form of a graph. The graph not only includes entities, but also includes a dependency between the entities, such as a social network relationship, a protein molecular structure relationship, and a customer relationship in an e-commerce platform. FIG. 1 is an exemplary diagram of a social network relationship. As shown in the figure, the diagram of the social network relationship includes dependencies between entities (the dependencies are represented by using connecting edges in the figure). For example, graphs shown in FIG. 1 are referred to as graph data, entities on the graphs are referred to as nodes in the graph data, and nodes directly or indirectly connected to a specific node are referred to as neighbor nodes of the specific node.

With the development of research on the graph data and the neural learning models in the industry, deep learning models for processing the graph data are springing up, and such deep learning models are collectively referred to as GNN models.

To accelerate the execution of the GNN models, the industry designs hardware acceleration units dedicated to execute the GNN models. These acceleration units are referred to as GNN acceleration units. In addition, the GNN acceleration units are continuously improved in the field.

In a GNN acceleration unit, various samplers may be included. A typical sampler is configured to implement random sampling for neighbor nodes around a specified node of a GNN model, and information of the sampled nodes is used for constructing an embedding expression (or referred to as an embedding vector) of the specified node. A main reason why the sampler samples information of some neighbor nodes of the specified node is to reduce computation complexity and storage overheads. For example, a quantity of neighbor nodes of many nodes may increase exponentially with an increase in a quantity of graph orders (or a quantity of layers), or the like. Therefore, if information of all the neighbor nodes are required for constructing the embedding expression of the specified node, the computation may become excessively complex and a large amount of storage overheads needs to be incurred.

FIG. 2 is a schematic diagram of an existing sampler for GNN execution. Referring to FIG. 2, the sampler 200 includes a random number generator 202 and an execution component 203 (a processing circuitry or one or more processors). When sampling needs to be performed for a specified node, an external system provides index values of N neighbor nodes of the specified node to the execution component 203. In addition, the random number generator 202 generates K random numbers, and the execution component 203 then compares the K random numbers with the index values of the N neighbor nodes of the node, to determine K sampled neighbor nodes, where N and K are positive integers greater than 1. However, due to a disordered state of the K random numbers, the execution component 203 needs to always store the index values of the N neighbor nodes for comparison, and it is not guaranteed that the finally obtained K neighbor nodes are evenly distributed around the specified node.

SUMMARY

An objective of this disclosure is to provide a sampler and an apparatus for executing a GNN model, to resolve the technical problems existing in existing technologies.

According to a first aspect of embodiments of the present disclosure, a sampler is provided. The sampler is configured to implement random sampling for neighbor nodes around a specified node of a GNN model, and the sampler includes: a random number generator, configured to generate a plurality of random numbers; a calculation circuitry, configured to: divide a value range between zero and a first integer value into a plurality of subranges of equal length based on a second integer value, and obtain a plurality of third integer values within the plurality of subranges based on the plurality of random numbers. The first integer value corresponds to a quantity of neighbor nodes of the specified node, the second integer value corresponds to a target number of neighbor nodes to be sampled for the specified node, and the plurality of third integer values correspond to the target number of neighbor nodes to be sampled. The sampler may further include an execution circuitry configured to: store an index value of at least one of the neighbor nodes of the specified node in an input buffer; identify index values of the target number of neighbor nodes to be sampled from the neighbor nodes of the specified node according to the index value stored in the input buffer and the plurality of third integer values; and write the identified index values into an output buffer.

In some embodiments, the execution circuitry may include: the input buffer, comprising at least one input storage unit, and each input storage unit is configured to store one index value of a neighbor node; the output buffer, comprising at least one output storage units, and each output storage unit is configured to store one index value of a neighbor node for sampling; and wherein to identify the target number of neighbor nodes, the execution circuitry is further configured to: compare the plurality of third integer values with the one index value in the input buffer; output an enabling signal when one of the plurality of third integer values is the same as a first index value in the input buffer; and trigger, by using the enabling signal, a write of the first index value outputted by the at least one input storage unit into a corresponding output storage unit.

In some embodiments, to compare the plurality of third integer values with the index value in the input buffer, the execution circuitry is further configured to: obtain a third integer value from the plurality of third integer values; compare the third integer value against the index value in the input buffer; in response to the third integer value matching the index value in the input buffer at position X: trigger the enabling signal to write the third integer value into the output buffer; obtain a next third integer value from the plurality of third integer values; and compare the next third integer value against the index value in the input buffer starting from the position X.

In some embodiments, the input buffer comprises one input storage unit, and the execution circuitry is further configured to: sequentially store the index values of the neighbor nodes of the specified node in ascending order in the input storage unit in a plurality of clock cycles, wherein one index value is stored in the input storage unit during each clock cycle; for an obtained third integer value, repeatedly compare the received third integer value with the index values in the input storage unit within the plurality of clock cycles; and when the received third integer value matches the first index value in the input storage unit, obtain another third integer value within a next clock cycle.

In some embodiments, the random number generator generates the plurality of random numbers in a first subrange of the plurality of subranges, and the calculation circuitry maps the plurality of random numbers to the plurality of subranges.

In some embodiments, the calculation circuitry maps the plurality of random numbers to the plurality of subranges based on Formula (1): $sum_I=round(random_I+N*I/K)$ Formula (1), wherein round represents a rounding operation, N represents the first integer value, K represents the second integer value, $sum_I$ represent an $I_{th}$ third integer value in the plurality of third integer values, $random_I$ represent an $I_{th}$ random number generated within a subrange of [N/K*I, N/K*(I+1)], $I \in \{0, 1, 2, 3, \ldots, K-1\}$, both N and K are positive integers greater than 1, and N is greater than K.

In some embodiments, the random number generator generates one random number within each of the plurality of subranges, to obtain the plurality of random numbers.

In some embodiments, the calculation circuitry maps the plurality of random numbers into the plurality of subranges to obtain the plurality of third integer values based on Formula (2):

$$sum_I = round\left(random_I + \frac{N}{K}\right), \quad \text{Formula (2)}$$

wherein round represents a rounding operation, N represents the first integer value, K represents the second integer value, $sum_I$ represent an $I_{th}$ third integer value of the plurality of third integer values within a subrange of [N/K*I, N/K*(I+1)], $I \in \{0, 1, 2, 3, \ldots, K-1\}$, $random_I$ represent random numbers within corresponding subranges, both N and K are positive integers greater than 1, and N is greater than K.

In some embodiments, the input buffer comprises a plurality of input storage units, and the execution circuitry is configured to: for a received third integer value from the plurality of third integer values, iteratively compare the received third integer value with the index values in the plurality of input storage units within a plurality of clock cycles, and after matching the received third integer value with one of the index values, obtain another new third integer value from the plurality of third integer values in a next clock cycle.

In some embodiments, both the input buffer and the output buffer are first-in first-out buffers.

According to a second aspect of embodiments of the present disclosure, a computer-implemented method for sampling neighbor nodes around a specified node of a graph neural network (GNN) model is described. The method may include: obtaining a quantity of neighbor nodes around the specified node of the GNN model, and a target number of neighbor nodes to be sampled for the specified node of the GNN model; dividing a range between zero and the quantity of neighbor nodes into a plurality of subranges of equal length based on the target number of neighbor nodes to be sampled; generating a plurality of random numbers based on a quantity of the plurality of the subranges. The method may further include determining a plurality of integer values within the plurality of subranges based on the plurality of random numbers; determining index values of the target number of neighbor nodes to be sampled from neighbor nodes of the specified node by matching index values of the neighbor nodes of the specified node and the plurality of determined integer values; and writing the determined index values into an output buffer for performing an GNN execution on the specified node.

In some embodiments, the determining the index values of the target number of neighbor nodes from the neighbor nodes of the specified comprises: receiving and storing index values of the neighbor nodes around the specified node; and comparing each of the plurality of integer values with the index values of the neighbor nodes of the specified node, and when one of the plurality of integer values matches a first index value in the index values, outputting the first index value as an index value of a neighbor node for sampling.

In some embodiments, the determining the index values of the target number of neighbor nodes from the neighbor nodes of the specified comprises: storing an index value of at least one of the neighbor nodes in an input buffer; obtaining a first integer value from the plurality of determined integer values; compare the first integer value against the index value in the input buffer; in response to the first integer value matching the index value in the input buffer at position X: triggering an enabling signal to write the matched index value into the output buffer; obtaining a second integer value from the plurality of determined integer values; and comparing the second integer value against the index value in the input buffer starting from the position X.

In some embodiments, the method may further include: in response to the first integer value not matching the index value in the input buffer, comparing the first integer value against a next index value in the input buffer.

In some embodiments, the generating a plurality of random numbers comprises: generating the plurality of random numbers in a first subrange of the plurality of subranges, and the determining a plurality of integer values within the plurality of subranges based on the plurality of random numbers comprises: mapping the plurality of random numbers across the plurality of subranges.

In some embodiments, the generating a plurality of random numbers comprises: generating one random number within each of the plurality of subranges, and the determining a plurality of integer values within the plurality of subranges based on the plurality of random numbers comprises: obtaining the plurality of random numbers.

In some embodiments, the method may further include: sequentially feeding index values of the neighbor nodes in an input buffer through a plurality of clock cycles, wherein an index value fed in a current clock cycle replaces an index value fed in a previous clock cycle, so that the input buffer stores one index value at any given clock cycle, and, wherein the sampling the target number of neighbor nodes from the neighbor nodes of the specified node according to the plurality of integer values comprises: receiving one of the plurality of integer values; comparing the received integer value against the index value stored in the input buffer; in response to the received integer value matching with the index value, storing the index value into the output buffer, and obtaining an index value of a next neighbor node into the input buffer and a next integer value; and in response to the received integer value not matching with the index value, obtaining the index value of the next neighbor node into the input buffer.

In some embodiments, the method may further include: obtaining features of sampled neighbor nodes based on the index values stored in the output buffer; and constructing an embedding vector for the specified node based on the features of sampled neighbor nodes.

According to a third aspect of embodiments of the present disclosure, a non-transitory computer-readable storage medium for sampling neighbor nodes around a specified node of a graph neural network (GNN) model is described. The storage medium stores instructions that, when executed by one or more processors, cause the one or more processors to perform operations including: obtaining a quantity of neighbor nodes around the specified node of the GNN model, and a target number of neighbor nodes to be sampled for the specified node of the GNN model; dividing a range between zero and the quantity of neighbor nodes into a plurality of subranges of equal length based on the target number of neighbor nodes to be sampled; generating a plurality of random numbers based on a quantity of the plurality of the subranges; determining a plurality of integer values within the plurality of subranges based on the plurality of random numbers; determining index values of the target number of neighbor nodes to be sampled from neighbor nodes of the specified node by matching index values of the neighbor nodes of the specified node and the plurality of determined integer values; and writing the determined index values into an output buffer for performing an GNN execution on the specified node.

BRIEF DESCRIPTION OF THE DRAWINGS

The above and other objectives, features, and advantages of the present disclosure are further clarified through the descriptions of embodiments of the present disclosure with reference to the following accompanying drawings. In the accompanying drawings:

FIG. 9 is used for illustrating K ranges into N neighbor nodes are divided in accordance with some embodiments.

FIG. 10 is a structural diagram of an enhanced version of the sampler illustrated in FIG. 8, in accordance with some embodiments.

FIG. 11 is used for illustrating a diagram of waveforms of a clock signal CLK and an enabling signal EN in accordance with some embodiments.

DETAILED DESCRIPTION

The following describes the present disclosure based on embodiments, but the present disclosure is not merely limited to the embodiments. Some specified details are described in detail in the following detailed descriptions of the present disclosure. A person skilled in the art may also fully understand the present disclosure without the descriptions of the details. To prevent the essence of the present disclosure from being confused, well-known methods, processes, and procedures are not described in detail. In addition, the accompanying drawings are not necessarily drawn to scale.

The following terms are used in this specification.

Acceleration unit: It is also referred to as a neural network acceleration unit. In the cases where a general-purpose processor has low efficiency in some special-purpose fields (such as image processing and operations for processing neural networks), the acceleration unit may refer to a processing unit that is designed for improving a data processing speed in the special-purpose fields. The processing unit is often coupled with a general-purpose processor CPU for use, is controlled by the general-purpose processor, and performs some processing tasks for a specific purpose or in a specific field, to improve computer processing efficiency for the specific purpose or in the specific field.

On-chip memory: a memory that is used alone in a primary core or a secondary core and cannot be shared.

Command processor: a command interface between an acceleration unit and a central processing unit (CPU) for driving the acceleration unit to work. The command processor receives instructions that the CPU requests the acceleration unit to execute, and distributes the instructions to cores in the acceleration unit for execution. In addition, the command processor is further responsible for synchronization of the cores in the acceleration unit.

GNN model: The GNN model organically combines connections with symbols, which not only enables a deep learning model to be applicable to a non-Euclidean structure like a graph, but also gives an inferential capability to the deep learning model. The GNN extends an existing neural network, and is configured to process graph data. In the graph data, each node is defined by its characteristics and related nodes, and an edge represent a relationship between the nodes.

Data Center

Figure 1:
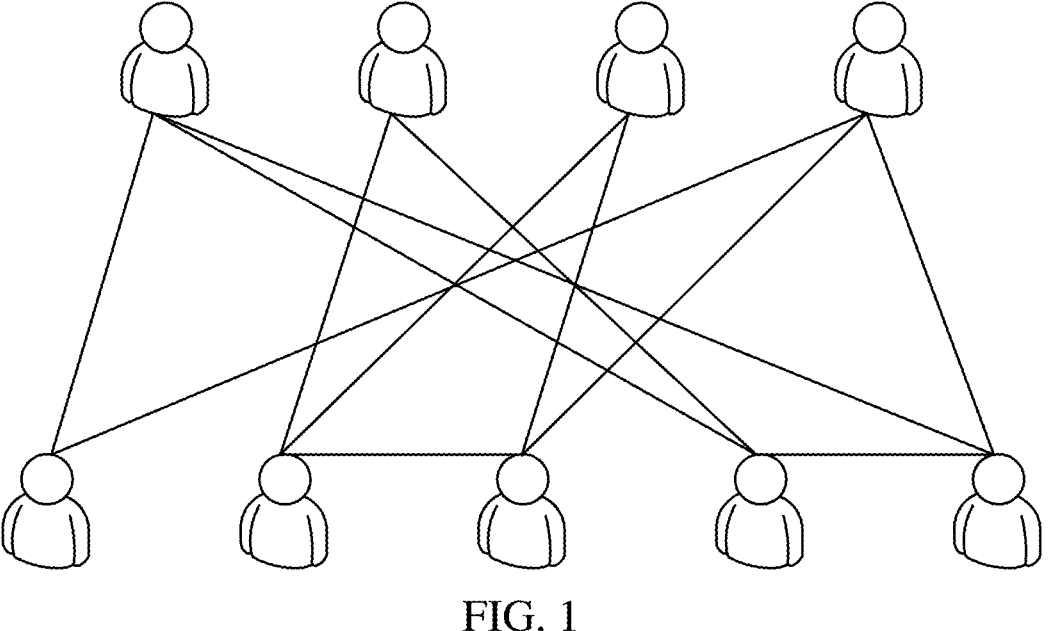
FIG. 1 is an exemplary diagram of a social network relationship in accordance with some embodiments.
Figure 2:
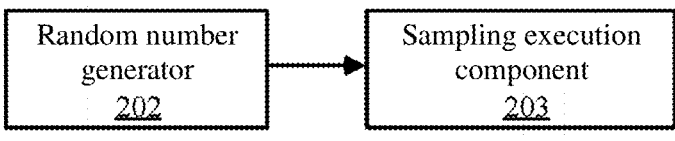
FIG. 2 is a schematic diagram of a sampler in existing technologies in accordance with some embodiments.
Figure 3:
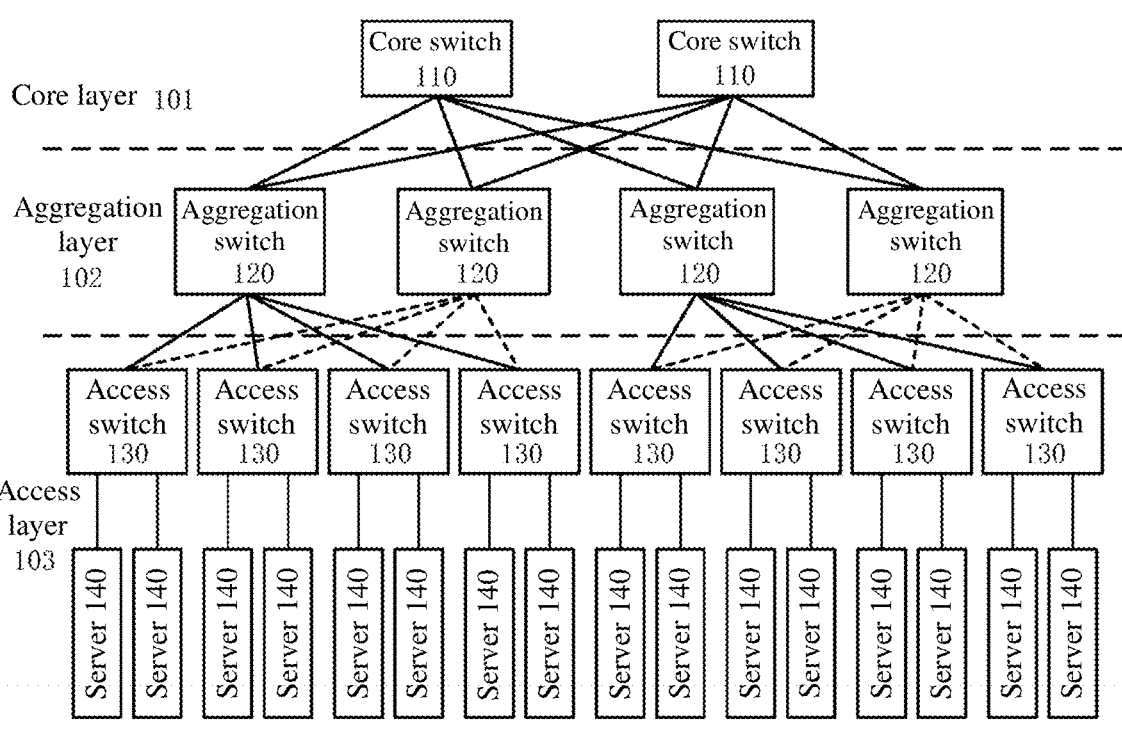
FIG. 3 is a hierarchical structure diagram of a data center in accordance with some embodiments.

FIG. 3 is a hierarchical structure diagram of a data center in a scenario to which an embodiment of the present disclosure is applied.

The data center is a specific device network that is globally coordinated, and is configured to transmit, accelerate, display, calculate, and store data information on an infrastructure of an Internet network. In the future development, the data center also becomes a competitive asset for enterprises. As the data center is widely applied, AI and the like are increasingly applied to the data center. As an important technology of AI, the neural network has been widely applied to big data analysis operations of the data center.

In a conventional large data center, the network structure is generally a three-layer structure shown in FIG. 3, also called a hierarchical inter-networking model. This model includes the following three layers.

Access layer 103: It may also be referred to as an edge layer, and may include one or more access switches 130 and servers 140 connected to the access switch 130. The servers 140 are processing and storage entities of the data center, and the processing and storage of a large amount of data in the data center are completed by the servers 140. The access switch 130 is a switch configured to enable the servers 140 to access the data center. One access switch 130 accesses a plurality of servers 140. The access switches 130 are generally located at a top of a rack. Therefore, the access switches 130 are referred to as top of rack switches, and are physically connected to the servers 140.

Aggregation layer 102: It may also be referred to as a distribution layer, and may include one or more aggregation switches 120. Each aggregation switch 120 is connected to a plurality of access switches 130, and also provides other services, such as a firewall, intrusion detection, and network analysis.

Core layer 101: It includes one or more core switches 110. The core switch 110 provides high-speed forwarding for packets entering and exiting the data center, and provides connectivity to the plurality of aggregation layers 102. Networks of the entire data center are divided into an L3 layer routing network and an L2 layer routing network. The core switch 110 generally provides a flexible L3 layer routing network to the networks of the entire data center.

Generally, the aggregation switch 120 is a demarcation point between the L2 layer routing network and the L3 layer routing network. The L2 network is located below the aggregation switch 120, and the L3 network is located above the aggregation switch. Each group of aggregation switches manages a point of delivery (POD), and each POD is an independent virtual local area network (VLAN) network. There is no need to modify an IP address and a default gateway during migration of the server within the POD, because one POD corresponds to one L2 broadcast domain.

A spanning tree protocol (STP) is generally used between the aggregation switch 120 and the access switch 130. In the STP, only one aggregation switch 120 is available for one VLAN network, and other aggregation switches 120 can be used only when a failure occurs (dotted lines in the foregoing figure). That is, horizontal expansion is impossible at the aggregation layer, because even if a plurality of aggregation switches 120 are added, only one aggregation switch still works.

Figure 4:
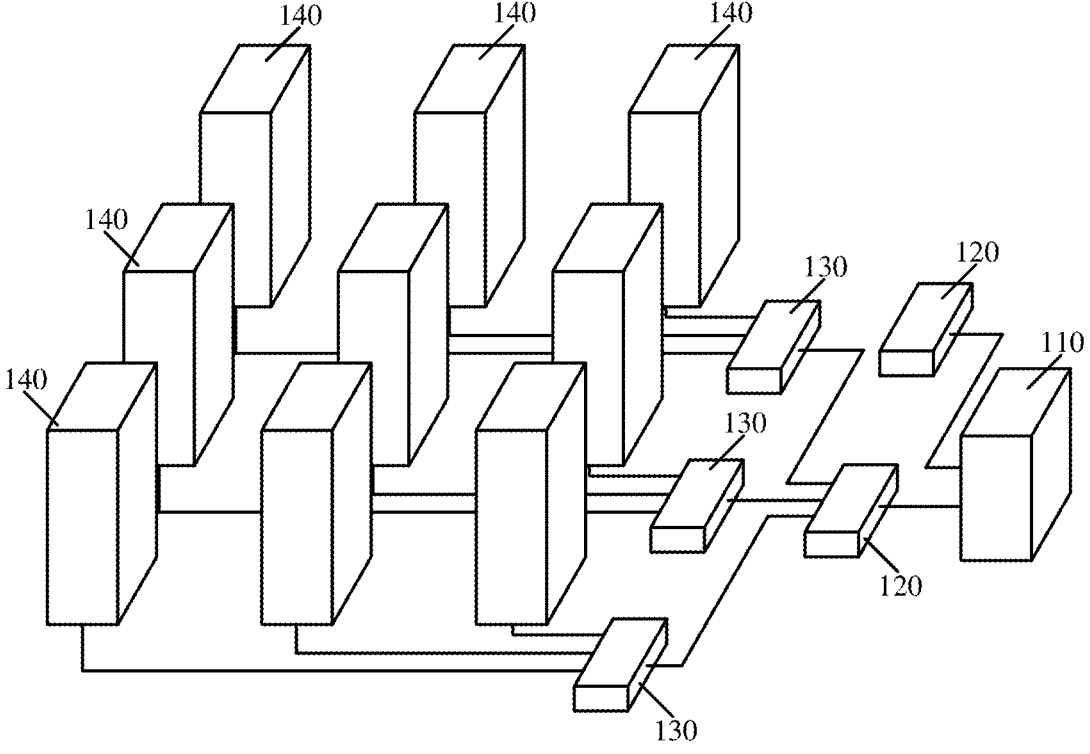
FIG. 4 is a three-dimensional structure diagram of a data center in accordance with some embodiments.

FIG. 4 shows a physical connection of components in the hierarchical data center in FIG. 3. As shown in FIG. 3, one core switch 110 is connected to a plurality of aggregation switches 120, one aggregation switch 120 is connected to a plurality of access switches 130, and one access switch 130 is connected to a plurality of servers 140.

Cloud Server

Figure 5:
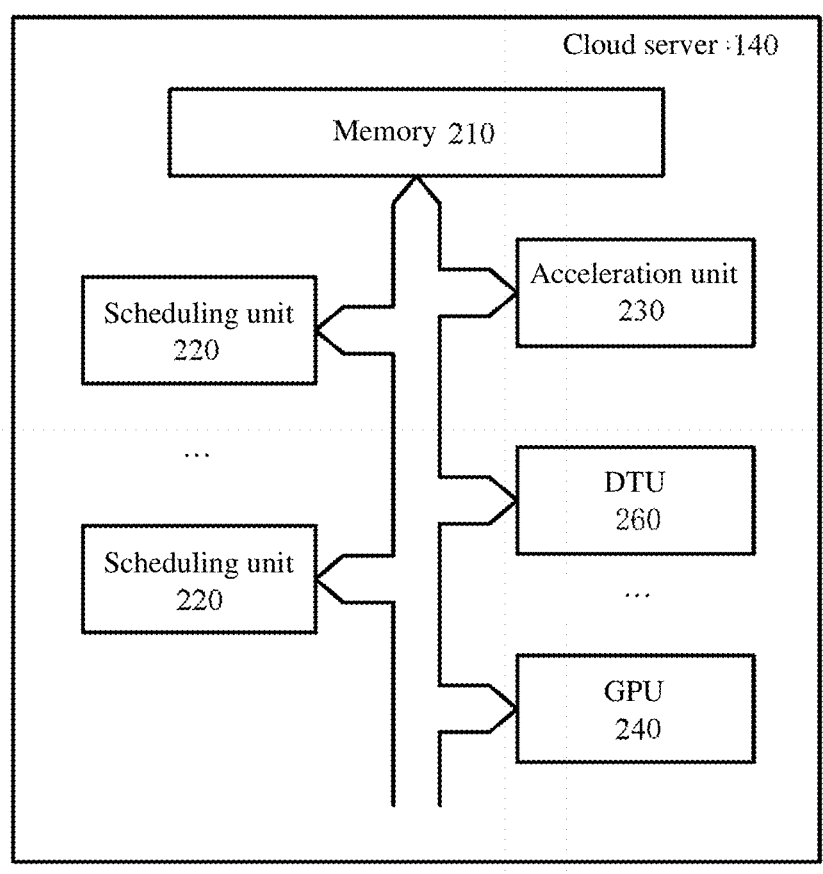
FIG. 5 is a schematic structural diagram of a cloud server in accordance with some embodiments.

The cloud server 140 is the real device in the data center. The cloud server 140 runs at a high speed to perform various tasks such as matrix calculation, image processing, machine learning, compression, and search sorting. Therefore, to efficiently complete the foregoing various tasks, the cloud server 140 generally includes a CPU and various acceleration units, as shown in FIG. 5. The acceleration unit is, for example, one of an acceleration unit, a data transmission unit (DTU), a graphics processing unit (GPU), an application-specific integrated circuit (ASIC), and a field programmable gate array (FPGA) of various neural networks. The acceleration units are separately described below by using an example shown in FIG. 5.

Data transmission unit (DTU) 260: The DTU is a wireless terminal device specifically configured to convert serial port data into IP data or convert IP data into serial port data for transmission through a wireless communication network. A main function of the DTU is to transmit data of a remote device back to a back-end center in a wireless manner. At a front end, the DTU and a device of a customer are connected by an interface. After being powered on to run, the DTU is first registered with a mobile general packet radio service (GPRS) network, and then establishes a socket connection with the back-end center disposed in the DTU. The back-end center serves as a server of the socket connection, and the DTU is a client of the socket connection. Therefore, the DTU and back-end software are used cooperatively. After a connection is established, the device at the front end and the back-end center may perform wireless data transmission by using the DTU.

Graphics processing unit (GPU) 240: The GPU is a processor that specializes in image and graphics-related operations. By using the GPU, disadvantage of an excessive small space of a calculation circuitry in the CPU is overcome. By using a large quantity of calculation units that specialize in graphics calculations, a graphics card reduces dependence on the CPU, and undertakes some computationally intensive image processing tasks that are originally undertaken by the CPU.

Application-specific integrated circuit (ASIC): The ASIC is an integrated circuit that is designed and manufactured in response to specific user requirements and needs of a specific electronic system. Because such an integrated circuit is customized according to the user requirements, a structure of the integrated circuit is often adapted to specific user requirements.

Field programmable gate array (FPGA): The FPGA is a product of further development on a basis of programmable devices such as programmable array logic (PAL) and generic array logic (GAL). The FPGA appears as a semi-custom circuit in the field of ASIC, not only resolves shortcomings of custom circuits, but also overcomes the disadvantage of limited quantity of original programmable device gate circuits.

GNN acceleration unit 230: The GNN acceleration unit is a general term dedicated for acceleration units of GNN models. The GNN acceleration unit may be a neural network model of Euclidean structure data, or may be a neural network model that processes non-Euclidean structure data (for example, graph data). A GNN accelerator that processes graph data is discussed in this specification. The GNN model (including executable code and graph data) may be stored in a memory 210, and a scheduling unit 220 deploys the GNN model to the GNN acceleration unit 230 for execution. For example, the scheduling unit 220 may inform the GNN acceleration unit 230 of storage positions of executable code of the GNN model in the memory 210 in the form of instructions, and the GNN acceleration unit 230 may then perform addressing according to the positions, and load executable instructions into a high-speed memory. The scheduling unit 220 may alternatively send executable code of a GNN to the GNN model acceleration unit 230 in the form of instructions, and the GNN acceleration unit 230 receives the executable code and loads the executable code into a high-speed memory. Similarly, the GNN acceleration unit 230 may alternatively obtain graph data in the foregoing manner. After obtaining the executable code and the graph data, the GNN acceleration unit 230 executes the executable code and feeds back execution results.

Figure 6:
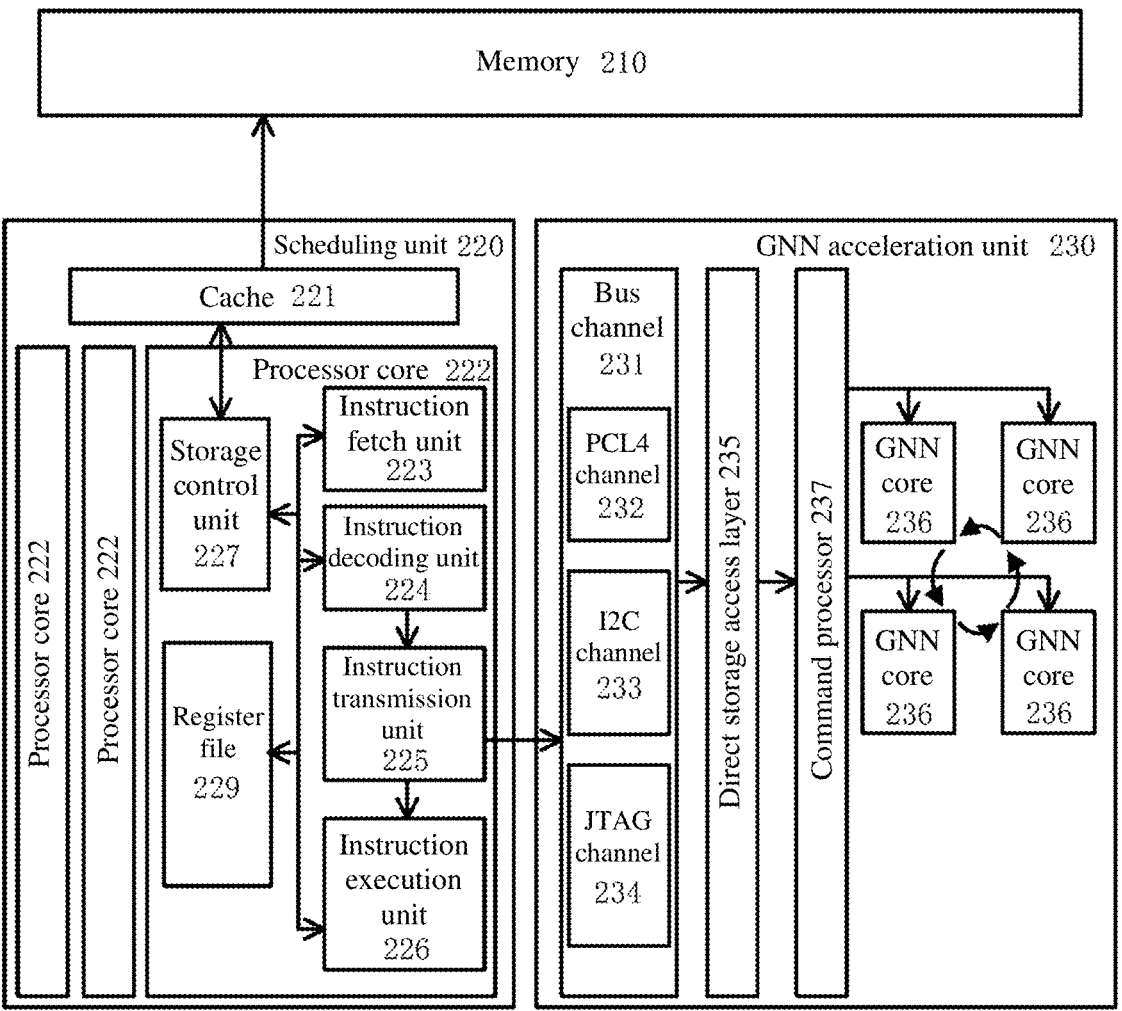
FIG. 6 is a schematic structural diagram of a GNN acceleration unit in accordance with some embodiments.

FIG. 6 illustrates how the scheduling unit 220 controls the acceleration unit 230 to work. In some embodiments, regardless of which neural network model the acceleration unit 230 is being applied to, the scheduling unit 220 generally drives the acceleration unit 230 to work in the same mode.

FIG. 6 further illustrates how the processing unit (e.g., the processor core 222) controls the GNN acceleration unit 230 to work using examples with reference to internal structure diagrams of the processing unit and the GNN acceleration unit 230. As shown in FIG. 6, the scheduling unit 220 includes a plurality of processor cores 222 and a cache 221 shared by the plurality of processor cores 222. Each processor core 222 includes an instruction fetch unit 223, an instruction decoding unit 224, an instruction transmission unit 225, and an instruction execution unit 226.

The instruction fetch unit 223 is configured to carry to-be-executed instructions from the memory 210 to an instruction register (which may be a register for storing instructions in a register file 229 shown in FIG. 6), and receive a next instruction fetch address or calculate a next instruction fetch address according to an instruction fetch algorithm. The instruction fetch algorithm includes, for example, incrementing the addresses or decrementing the addresses according to an instruction length.

After fetching the instructions, the scheduling unit 220 enters an instruction decoding stage, and the instruction decoding unit 224 decodes the fetched instructions according to a predetermined instruction format, to obtain operand retrieving information required by the fetched instructions, so as to make preparation for operations of the instruction execution unit 226. The operand retrieving information may be, for example, immediate data, a register, or other software/hardware that can provide source operands.

The instruction transmission unit 225 is located between the instruction decoding unit 224 and the instruction execution unit 226, and is configured to schedule and control instructions, to efficiently distribute the instructions to different instruction execution units 226, so that a parallel operation of a plurality of instructions is possible.

After the instruction transmission unit 225 transmits the instructions to the instruction execution units 226, the instruction execution units 226 start to execute the instructions. However, if determining that the instructions should be executed by the acceleration units, the instruction execution units 226 forward the instructions to corresponding acceleration units for execution. For example, if the instruction is a GNN inference or GNN training instruction, the instruction execution unit 226 no longer executes the instruction, but sends the instruction to the GNN acceleration unit 230 by using a bus, and the instruction is executed by the GNN acceleration unit 230.

The GNN acceleration unit 230 includes one or more GNN cores, a command processor 237, a direct storage access mechanism 235, and a bus channel 231 inside.

The bus channel 231 is a channel through which an instruction enters and exits the GNN acceleration unit 230 from the bus. According to different mechanisms, the bus channel 231 may include a peripheral component interconnect express (PCIE) channel 232, an inter-integrated circuit (I²C) channel 233, and a Joint Test Action Group (JTAG) channel 234.

PCIE, namely, PCI-Express, is a high-speed serial computer expansion bus standard proposed by Intel in 2001, and aims to replace old PCI, PCI-X and AGP bus standards. PCIE belongs to high-speed serial point-to-point dual-channel high-bandwidth transmission, and devices connected are allocated with exclusive channel bandwidths without sharing bus bandwidths, and is used to mainly support functions such as active power management, error reporting, end-to-end reliable transmission, hot plug, and quality of service. Major advantage of PCIE is high data transmission rate, and with considerable development potential. Currently, most of the PCIE buses are PCIE GEN3, but PCIE GEN4 may alternatively be used in this embodiment of the present disclosure, that is, a bus channel following a PCI-Express 4.0 standard.

The I²C channel 233 is a simple, bidirectional two-wire synchronous serial bus channel developed by Philips. The I²C channel requires only two wires for information transmission between devices on the bus.

JTAG is the abbreviation of Joint Test Action Group, and is the common name of IEEE standard 1149.1 standard test access port and a boundary scan structure. This standard is used for verifying design and testing functions of printed circuit boards. In 1990, the JTAG was formally standardized by IEEE's 1149.1-1990 document. In 1994, a supplementary document was added for describing boundary scan description language (BSDL). From then on, this standard is widely used by global electronic enterprises. Boundary scan almost becomes a synonym of the JTAG. The JTAG channel 234 is a bus channel that follows the standard.

The direct memory access (DMA) mechanism 235 is a function provided by some computer bus architectures, which causes data to be directly written from an auxiliary device (for example, an external memory) to an on-chip memory of the GNN acceleration unit 230. Compared with a manner in which all data transmission between devices need to pass through the command processor 237, this manner greatly improves the data access efficiency. Due to such mechanism, the core of the GNN acceleration unit 230 may directly access the memory 210, and read parameters of the deep learning model (for example, weight parameters of each node), thereby greatly improving data access efficiency. Although that the DMA mechanism 235 is located between the command processor 237 and the bus channel 231, design of the GNN acceleration unit 230 is not limited thereto. In some hardware designs, each GNN core may include one DMA mechanism 235. Therefore, the GNN core does not need to pass through the command processor 237, but directly reads data from the auxiliary device and writes the data into the on-chip memory of the GNN acceleration unit 230.

The command processor 237 distributes the instructions sent by the scheduling unit 220 to the GNN acceleration unit 230 to a GNN core 236 for execution. The instruction execution unit 226 sends to-be-executed instructions that need to be executed by the GNN acceleration unit 230 to the GNN acceleration unit 230, or the instruction execution unit 226 informs storage positions of to-be-executed instructions in the memory 210. After entering from the bus channel 231, a sequence of to-be-executed instructions is cached in the command processor 237, and the command processor 237 selects a GNN core, and distributes the sequence of instructions to the GNN core for execution. The to-be-executed instructions come from a compiled deep learning model. It should be understood that the sequence of to-be-executed instructions may include to-be-executed instructions that are executed in the scheduling unit 220 and to-be-executed instructions that need to be executed in the GNN acceleration unit 230.

GNN Core

Figure 7:
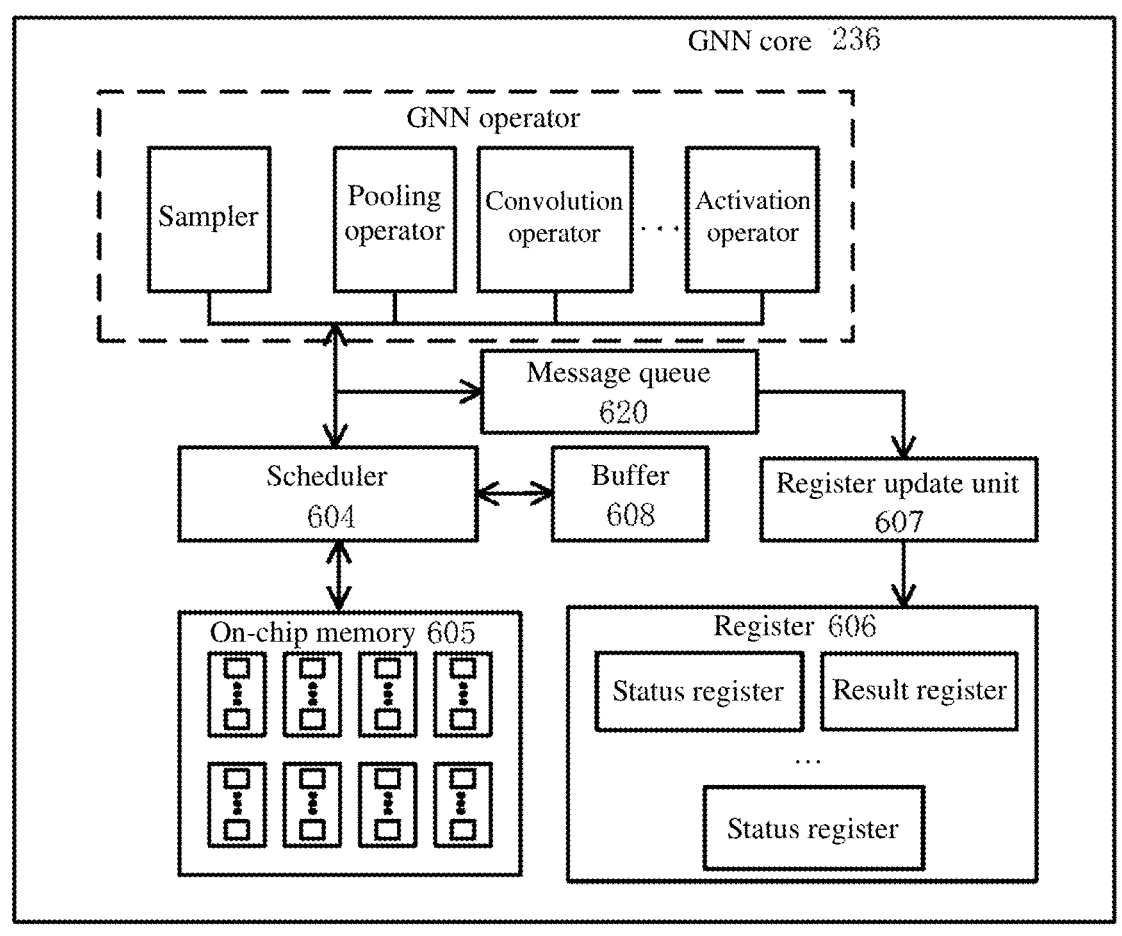
FIG. 7 is a schematic structural diagram of a GNN core in accordance with some embodiments.

FIG. 7 is a schematic structural diagram of a GNN core. The GNN core 236 is the key part of implementing a GNN model by hardware, and includes a scheduler 604, a buffer 608, a register 606, various operators such as a sampler, a pooling operator, a convolution operator, and an activation operator, and a register update unit 607. The operator is a hardware unit that executes one or more instructions of the GNN model.

The scheduler 604 receives instructions from the outside, and triggers one or more GNN operators according to the instructions. The GNN operator is a hardware unit configured to execute executable instructions in the GNN model. A message queue 620 is used between the GNN operators for transferring data. For example, the scheduler 604 triggers execution of an operator 1, the operator 1 transmits intermediate data to the message queue 620, and an operator 2 obtains the intermediate data from the message queue 620 as input data for execution. The message queue 620 is a general term for message queues between operators. However, actually, different message queues are used between different operators for transmitting the intermediate data. In addition, operator execution results are written into a result queue (also included in the message queue 620), and the register update unit 607 obtains the operator execution results from the result queue, and updates a corresponding status register, result register and/or status register accordingly. The scheduler 604 may alternatively send various requests to the outside, and the requests are sent by using the command processor 237 and through the bus channel 231. For example, the scheduler 604 may send a data loading request to the scheduling unit 220, the scheduling unit 220 obtains a data access address and transfers the access address to the scheduler 604, the scheduler 604 provides the data access address to an acceleration unit GNN core, the acceleration unit GNN core may perform control to the DMA mechanism 609, and the DMA mechanism 609 controls data loading.

It should be pointed out that the GNN model in this specification is a general term of all models to which a neural network is applicable on graph data. However, according to different technologies and classification methods being used, the GNN models may be divided into different types. For example, from a perspective of propagation manners, the GNN models may be divided into a graph convolutional neural network (GCN) model, a graph attention network (GAT, abbreviated for distinguishing the GAT from the GAN) model, a graph long short-term memory (LSTM) model, and the like. Therefore, one GNN acceleration unit is generally dedicated for accelerating one type of GNN models, and different GNN acceleration units may be designed with different hardware operators. However, generally, all the GNN acceleration units include a typical sampler. The sampler is configured to implement random sampling for neighbor nodes around a specified node of a GNN model, and information of some sampled nodes is used for constructing an embedding expression of the specified node.

Sampler

Figure 8:
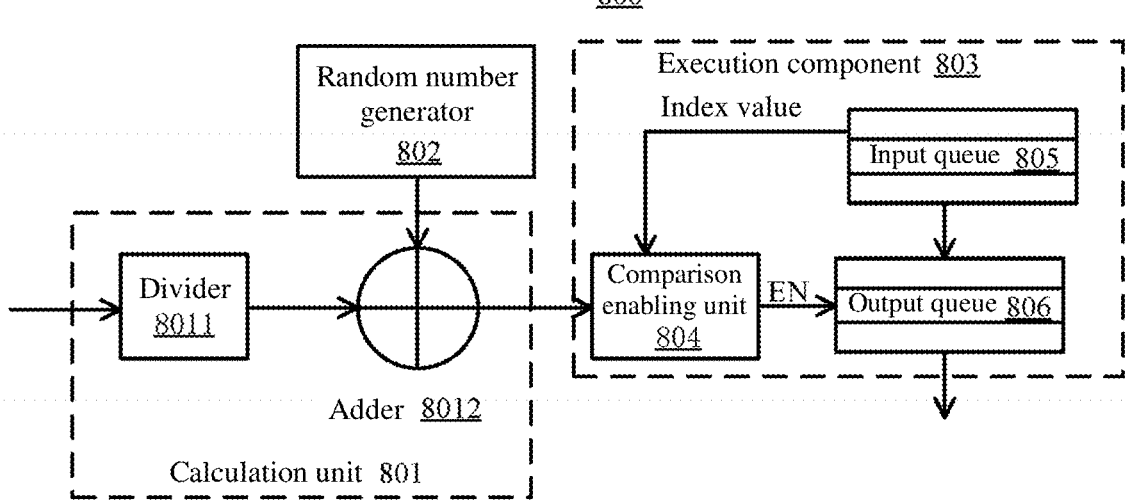
FIG. 8 is a schematic structural diagram of a sampler in accordance with some embodiments.

FIG. 8 is a structural diagram of a sampler in accordance with some embodiments. As shown in the figure, the sampler 800 includes a calculation unit/circuitry 801, a random number generator 802, and an execution component 803.

In some embodiments, the random number generator 802 is configured to generate random number, and the calculation unit 801 is configured to perform a specific mathematical operation. For example, the specific mathematical operation includes dividing a value range between zero and a first integer value into a plurality of subranges of equal length based on a second integer value, and obtaining a plurality of third integer values within the plurality of subranges based on a plurality of random numbers received from the random number generator 802. The first integer value represents a quantity of a plurality of neighbor nodes of the specified node, and the second integer value represents a quantity of to-be-sampled neighbor nodes for the specified node.

In some embodiments, the execution component 803 is configured to determine the to-be-sampled neighbor nodes from all the neighbor nodes around the specified node according to the plurality of third integer values.

According to the sampler provided in the embodiments of the present disclosure, for a specified node, a value range between zero and a quantity of all neighbor nodes around the specified node may be determined. The range is first divided into a plurality of subranges, and to-be-sampled neighbor nodes are then determined for the specified node according to a plurality of random numbers obtained within the plurality of subranges, thereby uniformly sampling the neighbor nodes around the specified node for the specified node.

In addition, the sampler samples the neighbor nodes around the specified node according to an order of the plurality of random numbers. Therefore, when a sampling operation corresponding to one random number is concluded, index values of neighbor nodes in a subrange corresponding to the random number may be no longer stored in the execution component (e.g., removed and replaced by index values of neighbor nodes in a subsequent subrange), thereby saving storage overheads in the execution component.

In an embodiment, the execution component 803 includes a comparison enabling unit 804, an input queue 805, and an output queue 806. The input queue 805 includes at least one input storage unit, and is configured to store index values of the plurality of neighbor nodes of the specified node. The output queue 806 includes at least one output storage unit. The input storage unit and the output storage unit are named for convenience of description only, and there is substantially no difference between the two. The comparison enabling unit 804 is configured to perform the following steps: continuously receiving the third integer values from the calculation unit 801, comparing the third integer values with the index values in the at least one input storage unit, outputting an enabling signal when one of the third integer values is the same as a first index value in the at least one input storage unit, and triggering, by using the enabling signal, the at least one output storage unit to write the first index value outputted by the at least one input storage unit into a corresponding output storage unit in the output queue 806.

In summary, in this embodiment, a value range between zero to a first integer value (a quantity of neighbor nodes of a specified node) is divided into a plurality of subranges of equal length, one random integer is then obtained within each of the plurality of subranges, an index value the same as each random integer is further found from a plurality of index values of the plurality of neighbor nodes and is written into the output queue, and the output storage units of the output queue store index values of the to-be-sampled neighbor nodes eventually. In this embodiment, one random integer is obtained within each of the plurality of subranges, and for each of the plurality of subranges, an index value of a neighbor node that is the same as the corresponding random integer is sampled for the subsequently GNN execution. For example, the sampled neighbor nodes may be used to construct the embedding expression (or referred to as an embedding vector) of the specified node. The embedding expression of the specified node may be constructed based on the embedding expression or other features of the sampled neighbor nodes. In other words, index value of each sampled neighbor node is located in each of the plurality of subranges. Therefore, the sampled neighbor nodes are uniformly distributed across the subranges, which helps balance the sampling deviation.

Still referring to FIG. 8, in an embodiment, the calculation unit 801 includes a divider 8011 and an adder 8012. The divider 8011 is configured to perform a division operation. If the first integer value is denoted by N, and the second integer value is denoted by K, the division operation is: step_len=N/K. The random number generator 802 is essentially a pseudo random number generator (that is, generates random numbers in a specified range). The random number generator 802 generates K random numbers in a value range among [0, step_len], [step_len, 2*step_len], . . . , and [(K–1)*step_len, K*step_len]. The adder 8012 is configured to add an operation result step_len outputted by the divider 8011 and the random numbers outputted by the random number generator 802 to obtain a sum, and output the sum to the comparison enabling unit 804. There are K random numbers, and therefore the calculation unit 801 outputs K sums.

The mathematical operation of the calculation unit 802 may be represented by using the following Formulas.

$$\text{step\_len}=N/K \qquad \text{Formula (1)}$$

$$\text{sum}_I=\text{round}(\text{random}_I+\text{step}_{len}*I) \qquad \text{Formula (2)}$$

where N and K are positive integers greater than 1, N is greater than K, random, represents a random number outputted each time, $I \in \{0, 1, 2, 3, \ldots, K-1\}$, and round represents a rounding operation.

In another embodiment, if the random number generator 802 generates K random numbers in a value range within [0, step_len], the calculation unit 801 further includes a multiplier (not shown). The mathematical operations performed by the multiplier, the adder, and the divider may be represented by using Formula (3) to Formula (5):

$$\text{step\_len}=N/K \qquad \text{Formula (3)}$$

$$\text{product}=\text{step\_len}*J \qquad \text{Formula (4)}$$

$$\text{sum}=\text{round}(\text{random}+\text{product}) \qquad \text{Formula (5)}$$

where N and K are positive integers greater than 1, N is greater than K, J is an integer, a value range of J meets Formula $J \in \{0, 1, 2, 3, \ldots, K-1\}$, and round represents a rounding operation.

A working procedure of the sampler is further described below based on FIG. 9. FIG. 9 is used for illustrating dividing N neighbor nodes into K subranges into.

According to this embodiment, the external system stores index values of N neighbor nodes of a specific node in the input queue 805, and this storage process is serially performed. That is, an index value of one neighbor node is stored in each clock cycle, and it takes a total of N clock cycles to complete a storage operation of the index values of the N neighbor nodes. Within the N clock cycles, the random number generator 802 works in parallel with the storing operations performed by the external system and performs K random number generation operations, and obtains K random numbers. Within the N cycles, the calculation unit 801 outputs K sums. Referring to FIG. 9, the K sums are K random integers in [0, step_len], [step_len, 2*step_len], [2*step_len, 3*step_len], . . . , and [(K–1)*step_len, K*step_len], respectively. Within the N clock cycles, each time the comparison enabling unit 804 receives a newly calculated sum from the calculation unit 801, the comparison enabling unit compares the sum with the index values in the input queue 805, and sends an enabling signal EN to a specific output storage unit when a first index value equal to the sum is obtained. The enabling signal EN triggers the output storage unit to write the first index value outputted by the input storage unit into the output storage unit. A next newly calculated sum can be received only after the first index value equal to the sum is found. Further, if N index values are inputted to the input queue 805 in an ascending order, a newest sum only needs to be compared with a newest index value (e.g., skipping the index values that are previously compared against the prior sums) when K gradually increasing sums (e.g., the K sums are also in an ascending order) are compared with the N gradually increasing index values. For example, if a first sum matches with a first index value at a location X in the input queue 805, the next sum only needs to start comparing with the index values staring from location X+1. In this way, for the N neighbor nodes, it only needs to take no more than N clock cycles to obtain index values of K sampled neighbor nodes.

In an embodiment, both the input queue 805 and the output queue 807 are first-in first-out queues. The first-in first-out queue means that an index value that first enters the queue is also outputted from the queue first. For example, an index value that first enters the input queue 805 is less than an index value that later enters the input queue 805.

FIG. 10 is a structural diagram of an enhanced version of the sampler illustrated in FIG. 8. In FIG. 10, the input queue includes only one input storage unit 807, that is, stores only one index value at any given time.

FIG. 11 includes an illustrative diagram of waveforms of a clock signal wave CLK and an enabling signal wave EN. An example signal control process of the sampler in FIG. 10 is described below based on FIG. 11. In a first clock cycle of CLK, the external system stores an index 1 in the input storage unit 807, and the comparison enabling unit 804 compares the index value index 1 in the input storage unit 807 with a received sum 1, which indicates that the two are different; next, in a second clock cycle of CLK, the external system removes index 1 and stores an index 2 in the input storage unit 807, and the comparison enabling unit 804 compares the sum 1 with the index 2 in the input storage unit 807. If the two are the same, a high-level enabling signal EN is outputted as a write enabling signal of the output queue 806, to trigger the output queue 806 to write the index value index 2 into a corresponding output storage unit of the output queue 806; then, in a third clock cycle of CLK, the external system stores an index 3 in the input storage unit 807, and the comparison enabling unit 804 receives a sum 2 and compares the sum 2 with the index 3, which indicates that the two are different; and further, in a fourth clock cycle of CLK, the external system stores an index 4 in the input storage unit 807, and the comparison enabling unit 804 compares the sum 2 with the index 4. If the two are the same, a high-level enabling signal EN is generated as a write enabling signal of the output queue 806, to trigger the output queue 806 to write the index value index 4 into a corresponding output storage unit of the output queue 806, and the rest can be deduced by analogy. However, it should be emphasized herein that when the external system stores (e.g., feeds one by one) the index values in the input storage unit 807, the index values need to be in ascending order. That is, index 1<index 2<index 3<index 4. In summary, the sampler provided in the embodiments of the present disclosure completes a sampling operation of K neighbor nodes within N clock cycles, while a sampling operation of N neighbor nodes needs to be completed within (N+K) clock cycles in existing technologies. Therefore, in the embodiments of the present disclosure, the sampling efficiency is improved, the delay is reduced, and sampled neighbor nodes are more uniform.

In this embodiment, only one storage unit is used for storing index values of neighbor nodes in the sampler in FIG. 10, while N storage units are needed to store the index values of the neighbor nodes in the sampler provided in existing technologies. Therefore, memory occupation is reduced, thereby reducing manufacturing costs.

Figures 12, 13:
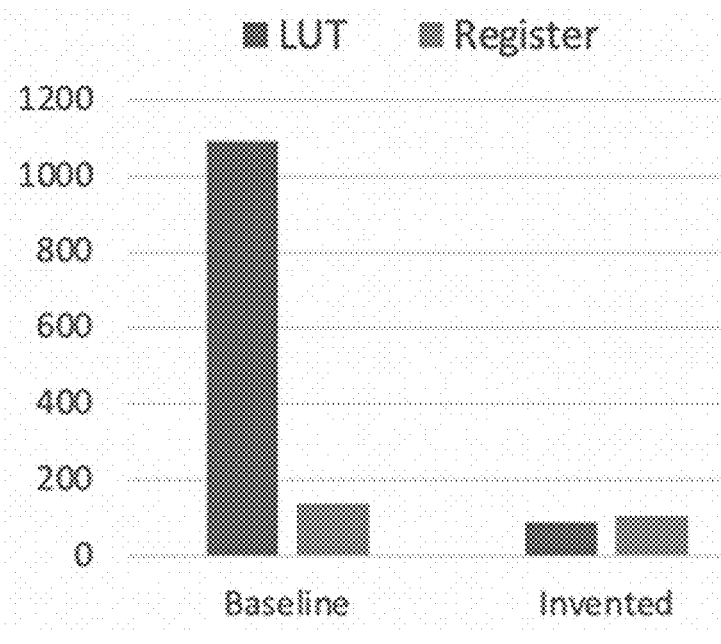
FIG. 12 is used for illustrating a histogram of performance indexes of samplers in existing technologies and embodiments of the present disclosure in accordance with some embodiments.
FIG. 13 is a flowchart of a sampling method for sampling neighbor nodes in GNN execution in accordance with some embodiments.

Based on a laboratory environment, the sampler in existing technologies and the sampler in the embodiments of the present disclosure are verified, to obtain the histogram shown in FIG. 12. BaseLine represents the sampler in existing technologies, Invented represents the sampler in the embodiments of the present disclosure, a left side of the histogram represents algorithm performance, and a right side represents a quantity of registers. It can be determined through experiments that the algorithm performance is improved by 91.9%, and the quantity of registers is saved by 23%. A quantity of neighbor nodes of the sampler in the experiments NMAX is 270, and a maximum value of a neighbor node that needs to be sampled KMAX is 25.

Corresponding to the sampler implemented by the foregoing hardware, the embodiments of the present disclosure further provide a sampling method implemented by software. The sampling method is used for implementing random sampling for neighbor nodes around a specified node of a GNN model. As shown in FIG. 13, the method includes the following steps.

Step S101. Generate a plurality of random numbers.

Step S102. Perform a mathematical operation, to obtain a plurality of third integer values. The mathematical operation referring to division of a value range between zero to a first integer value into a plurality of subranges of equal length based on a second integer value, and a plurality of third integer values are obtained within the plurality of subranges based on the plurality of random numbers, where the first integer value represents a quantity of all the neighbor nodes around the specified node, and the second integer value represents a quantity of to-be-sampled neighbor nodes for the specified node.

Step S103. Determine the to-be-sampled neighbor nodes from all the neighbor nodes around the specified node according to the plurality of third integer values.

In an embodiment, step S103 includes: receiving and storing index values of all the neighbor nodes around the specified node; and comparing each of the plurality of third integer values with the index values of all the neighbor nodes of the specified node, and when one of the plurality of third integer values is the same as a first index value, outputting the first index value and recording the first index value as an index value of the to-be-sampled neighbor node, and performing sampling accordingly.

In an embodiment, step S101 includes: generating a plurality of random numbers in a first subrange of the plurality of subranges, and the mathematical operation is used for separately mapping the plurality of random numbers to the plurality of subranges. The mapping may be completed by using the following Formula (6):

$$\text{sum}_j=\text{round}(\text{random}_j+N*I/K) \qquad \text{Formula (6),}$$

where round represents a rounding operation, N represents a quantity of neighbor nodes, K represents a quantity of ranges to be obtained through division, $I\in\{0, 1, 2, 3, \ldots, \text{and } K-1\}$, both N and K are positive integers greater than 1, and N is greater than K.

Commercial value in the embodiments of the present disclosure:

The sampler provided in the embodiments of the present disclosure is applicable to a GNN acceleration unit, and can uniformly sample neighbor nodes. In a further embodiment, a quantity of memories may be further reduced and the sampling efficiency is improved, thereby reducing manufacturing costs of the GNN acceleration unit. Therefore, the sampler provided in the embodiments of the present disclosure and the GNN acceleration unit including such a sampler have practical application prospects and commercial value.

A person skilled in the art may understand that the present disclosure may be implemented as systems, methods, or computer program products. Therefore, the present disclosure may be implemented in the following forms, that is, the form of complete hardware, complete software (including firmware, resident software, and micro code), or may be implemented as a combination of hardware and software. In addition, in some embodiments, the present disclosure may further be implemented in the form of one or more computer program products in a computer-readable medium. The computer-readable medium includes computer-readable program code.

The computer program product may be any combination of one or more computer-readable mediums. The computer-readable medium may be a computer-readable signal medium or a computer-readable storage medium. The computer-readable storage medium may be, for example, but not limited to, an electric, magnetic, optical, electromagnetic, infrared, or semi-conductive system, apparatus, or device, or any combination thereof. A more specific example of the computer-readable storage medium includes: an electrical connection having one or more wires, a portable computer magnetic disk, a hard disk, a random access memory (RAM), a read-only memory (ROM), an erasable programmable ROM (EPROM or flash memory), an optical fiber, a compact disk ROM (CD-ROM), an optical storage device, a magnetic storage device, or any appropriate combination thereof. In this specification, the computer-readable storage medium may be any tangible medium containing or storing a program, and the program may be used by or used in combination with a processing unit, an apparatus, or a device.

The computer-readable signal medium may include a data signal being in a baseband or transmitted as a part of a carrier, which carries computer-readable program code. The propagated data signal may be in a plurality of forms, including, but not limited to, an electromagnetic signal, an optical signal, or any other appropriate combination thereof. The computer-readable signal medium may further be any computer-readable medium other than the computer-readable storage medium. The computer-readable medium may send, propagate, or transmit a program that is used by or used in conjunction with an instruction execution system, an apparatus, or a device.

The program code included in the computer-readable medium may be transmitted by using any suitable medium, including but not limited to, wireless transmission, a wire, a cable, radio frequency (RF) or the like, or any suitable combination thereof.

The computer program code used for executing the embodiments of the present disclosure may be written by using one or more programming languages or a combination thereof. The programming languages include an object-oriented programming language such as Java and C++, and may also include a conventional procedural programming language such as C. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a computer of a user through any type of network including a local area network (LAN) or a wide area network (WAN), or may be connected to an external computer (for example, through the Internet by using an Internet service provider).

The foregoing descriptions are merely preferred embodiments of the present disclosure, but are not intended to limit the present disclosure. For a person skilled in the art, the present disclosure may include various modifications and changes. Any modification, equivalent replacement, or improvement and the like made within the spirit and principle of the present disclosure shall fall within the protection scope of the present disclosure.

What is claimed is:

1. A sampler for a graph neural network (GNN) accelerator, wherein the sampler is configured to implement random sampling for neighbor nodes of a specified node in a GNN, and the sampler comprises:
   a random number generator, configured to generate a plurality of random numbers;
   a calculation circuitry, configured to:
      divide a value range between zero and a first integer value into a plurality of subranges of equal length based on a second integer value, and
      obtain a plurality of third integer values within the plurality of subranges based on the plurality of random numbers,
      wherein the first integer value comprises a quantity of neighbor nodes of the specified node, the second integer value comprises a target number of neighbor nodes to be sampled for the specified node, and the plurality of third integer values correspond to the target number of neighbor nodes to be sampled; and
   an execution circuitry, configured to:
      store an index value of at least one of the neighbor nodes of the specified node in an input buffer;
      identify index values of the target number of neighbor nodes to be sampled from the neighbor nodes of the specified node according to the index value stored in the input buffer and the plurality of third integer values; and
      write the identified index values into an output buffer.

2. The sampler according to claim 1, wherein the execution circuitry comprises:
   the input buffer, comprising at least one input storage unit, and each input storage unit is configured to store one index value of a neighbor node;
   the output buffer, comprising at least one output storage units, and each output storage unit is configured to store one index value of a neighbor node for sampling; and
   wherein to identify the target number of neighbor nodes, the execution circuitry is further configured to:
      compare the plurality of third integer values with the one index value in the input buffer;

output an enabling signal when one of the plurality of third integer values is the same as a first index value in the input buffer; and
      trigger, by using the enabling signal, a write of the first index value outputted by the at least one input storage unit into a corresponding output storage unit.

3. The sampler according to claim 2, wherein to compare the plurality of third integer values with the index value in the input buffer, the execution circuitry is further configured to:
   obtain a third integer value from the plurality of third integer values;
   compare the third integer value against the index value in the input buffer;
   in response to the third integer value matching the index value in the input buffer at position X:
      trigger the enabling signal to write the third integer value into the output buffer;
      obtain a next third integer value from the plurality of third integer values; and
      compare the next third integer value against the index value in the input buffer starting from the position X.

4. The sampler according to claim 2, wherein the input buffer comprises one input storage unit, and the execution circuitry is further configured to:
   sequentially store the index values of the neighbor nodes of the specified node in ascending order in the input storage unit in a plurality of clock cycles, wherein one index value is stored in the input storage unit during each clock cycle;
   for an obtained third integer value, repeatedly compare the received third integer value with the index values in the input storage unit within the plurality of clock cycles; and
   when the received third integer value matches the first index value in the input storage unit, obtain another third integer value within a next clock cycle.

5. The sampler according to claim 1, wherein the random number generator generates the plurality of random numbers in a first subrange of the plurality of subranges, and the calculation circuitry maps the plurality of random numbers to the plurality of subranges.

6. The sampler according to claim 5, wherein the calculation circuitry maps the plurality of random numbers to the plurality of subranges based on Formula (1):

$$\text{sum}_I = \text{round}(\text{random}_I + N*I/K) \qquad \text{Formula (1)},$$

wherein round represents a rounding operation, N represents the first integer value, K represents the second integer value, $\text{sum}_I$ represent an $I_{th}$ third integer value in the plurality of third integer values, $\text{random}_I$ represent an $I_{th}$ random number generated within a subrange of $[N/K*I, N/K*(I+1)]$, $I \in \{0, 1, 2, 3, \ldots, K-1\}$, both N and K are positive integers greater than 1, and N is greater than K.

7. The sampler according to claim 1, wherein the random number generator generates one random number within each of the plurality of subranges, to obtain the plurality of random numbers.

8. The sampler according to claim 7, wherein the calculation circuitry maps the plurality of random numbers into the plurality of subranges to obtain the plurality of third integer values based on Formula (2):

$$\text{sum}_I = \text{round}\left(\text{random}_I + \frac{N}{K}\right). \qquad \text{Formula (2)}$$

wherein round represents a rounding operation, N represents the first integer value, K represents the second integer value, $sum_I$ represent an $I_{th}$ third integer value of the plurality of third integer values within a subrange of $[N/K*I, N/K*(I+1)]$, $I \in \{0, 1, 2, 3, \ldots, K-1\}$, random, represent random numbers within corresponding subranges, both N and K are positive integers greater than 1, and N is greater than K.

9. The sampler according to claim 2, wherein the input buffer comprises a plurality of input storage units, and the execution circuitry is configured to:

for a received third integer value from the plurality of third integer values, iteratively compare the received third integer value with the index values in the plurality of input storage units within a plurality of clock cycles, and after matching the received third integer value with one of the index values, obtain another new third integer value from the plurality of third integer values in a next clock cycle.

10. The sampler according to claim 2, wherein both the input buffer and the output buffer are first-in first-out buffers.

11. A computer-implemented method, for sampling neighbor nodes around a specified node of a graph neural network (GNN) model, the method comprising:

obtaining a quantity of neighbor nodes around the specified node of the GNN model, and a target number of neighbor nodes to be sampled for the specified node of the GNN model;

dividing a range between zero and the quantity of neighbor nodes into a plurality of subranges of equal length based on the target number of neighbor nodes to be sampled;

generating a plurality of random numbers based on a quantity of the plurality of the subranges;

determining a plurality of integer values within the plurality of subranges based on the plurality of random numbers;

determining index values of the target number of neighbor nodes to be sampled from neighbor nodes of the specified node by matching index values of the neighbor nodes of the specified node and the plurality of determined integer values; and writing the determined index values into an output buffer for performing an GNN execution on the specified node.

12. The method according to claim 11, wherein the determining the index values of the target number of neighbor nodes from the neighbor nodes of the specified node comprises:

receiving and storing index values of the neighbor nodes around the specified node; and comparing each of the plurality of integer values with the index values of the neighbor nodes of the specified node, and when one of the plurality of integer values matches a first index value in the index values, outputting the first index value as an index value of a neighbor node for sampling.

13. The method according to claim 11, wherein the determining the index values of the target number of neighbor nodes from the neighbor nodes of the specified node comprises:

storing an index value of at least one of the neighbor nodes in an input buffer;

obtaining a first integer value from the plurality of determined integer values;

compare the first integer value against the index value in the input buffer;

in response to the first integer value matching the index value in the input buffer at position X:

triggering an enabling signal to write the matched index value into the output buffer;

obtaining a second integer value from the plurality of determined integer values; and comparing the second integer value against the index value in the input buffer starting from the position X.

14. The method according to claim 13, further comprising:

in response to the first integer value not matching the index value in the input buffer, comparing the first integer value against a next index value in the input buffer.

15. The method according to claim 11, wherein the generating a plurality of random numbers comprises: generating the plurality of random numbers in a first subrange of the plurality of subranges, and the determining a plurality of integer values within the plurality of subranges based on the plurality of random numbers comprises:

mapping the plurality of random numbers across the plurality of subranges.

16. The method according to claim 11, wherein the generating a plurality of random numbers comprises: generating one random number within each of the plurality of subranges, and the determining a plurality of integer values within the plurality of subranges based on the plurality of random numbers comprises:

obtaining the plurality of random numbers.

17. The method according to claim 11, further comprising:

sequentially feeding index values of the neighbor nodes in an input buffer through a plurality of clock cycles, wherein an index value fed in a current clock cycle replaces an index value fed in a previous clock cycle, so that the input buffer stores one index value at any given clock cycle, and wherein the sampling the target number of neighbor nodes from the neighbor nodes of the specified node according to the plurality of integer values comprises:

receiving one of the plurality of integer values;

comparing the received integer value against the index value stored in the input buffer;

in response to the received integer value matching with the index value, storing the index value into the output buffer, and obtaining an index value of a next neighbor node into the input buffer and a next integer value; and in response to the received integer value not matching with the index value, obtaining the index value of the next neighbor node into the input buffer.

18. The method according to claim 11, further comprising:

obtaining features of sampled neighbor nodes based on the index values stored in the output buffer; and constructing an embedding vector for the specified node based on the features of sampled neighbor nodes.

19. The method according to claim 11, wherein the output buffer is a first-in first-out buffer.

20. A non-transitory computer-readable storage medium for sampling neighbor nodes around a specified node of a graph neural network (GNN) model, the storage medium storing instructions that, when executed by one or more processors, cause the one or more processors to perform operations comprising:

obtaining a quantity of neighbor nodes around the specified node of the GNN model, and a target number of neighbor nodes to be sampled for the specified node of the GNN model;

dividing a range between zero and the quantity of neighbor nodes into a plurality of subranges of equal length based on the target number of neighbor nodes to be sampled;

generating a plurality of random numbers based on a quantity of the plurality of the subranges;

determining a plurality of integer values within the plurality of subranges based on the plurality of random numbers;

determining index values of the target number of neighbor nodes to be sampled from neighbor nodes of the specified node by matching index values of the neighbor nodes of the specified node and the plurality of determined integer values; and writing the determined index values into an output buffer for performing an GNN execution on the specified node.

* * * * *